(12) United States Patent
Bajpayee et al.

(10) Patent No.: US 9,428,404 B2
(45) Date of Patent: Aug. 30, 2016

(54) WATER EXTRACTION USING A DIRECTIONAL SOLVENT

(71) Applicant: Massachusetts Institute of Technology, Cambridge, MA (US)

(72) Inventors: Anurag Bajpayee, Cambridge, MA (US); Stephan Josef Peter Kress, Zurich (CH); Kevin Kleinguetl, Boston, MA (US); Gang Chen, Carlisle, MA (US); Michael Fowler, Ashburn, VA (US)

(73) Assignee: Massachusetts Institute of Technology, Cambridge, MA (US)

( * ) Notice: Subject to any disclaimer, the term of this patent is extended or adjusted under 35 U.S.C. 154(b) by 653 days.

(21) Appl. No.: 13/644,430

(22) Filed: Oct. 4, 2012

(65) Prior Publication Data

US 2013/0082003 A1 Apr. 4, 2013

Related U.S. Application Data

(60) Provisional application No. 61/542,934, filed on Oct. 4, 2011.

(51) Int. Cl.
*B01D 11/04* (2006.01)
*C02F 1/26* (2006.01)
(Continued)

(52) U.S. Cl.
CPC ............. *C02F 1/26* (2013.01); *B01D 11/0449* (2013.01); *B01D 11/0488* (2013.01); *B01D 11/0492* (2013.01); *C02F 1/265* (2013.01); *C02F 2103/08* (2013.01); *C02F 2103/365* (2013.01); *C02F 2303/18* (2013.01); *Y02W 10/37* (2015.05)

(58) Field of Classification Search
CPC .............. B01D 11/04; B01D 11/0492; B01D 11/0449; B01D 11/0488; C02F 1/26; C02F 1/02; C02F 2103/08; C02F 2103/365
See application file for complete search history.

(56) References Cited

U.S. PATENT DOCUMENTS 2,701,771 A * 2/1955 Johnson et al. .............. 426/599
3,088,909 A   5/1963 Davison et al.
(Continued)

FOREIGN PATENT DOCUMENTS

CN    88202318 U      11/1988
GB    1369667 A   *  10/1974
(Continued)

OTHER PUBLICATIONS

Eow et al. Electrostatic enhancement of coalescence of water droplets in oil: a review of the current understanding. Chemical Engineering Journal 84 (2001) 173-192.*
(Continued)

*Primary Examiner* — Katherine Zalasky
(74) *Attorney, Agent, or Firm* — Modern Times Legal; Robert J. Sayre

(57) ABSTRACT

Purified water can be obtained via a continuous or semi-continuous process by mixing a liquid composition (e.g., sea water or produced frac water) including water with a directional solvent to selectively dissolve water from the liquid composition into the directional solvent. The concentrated remainder of the liquid composition (e.g., brine) is removed, and the water is precipitated from the directional solvent and removed in a purified form. The solvent is then reused as the process is repeated in a continuous or semi-continuous operation.

12 Claims, 9 Drawing Sheets

(51) Int. Cl.
*C02F 1/469* (2006.01)
*C02F 103/08* (2006.01)
*C02F 103/36* (2006.01)

(56) References Cited

U.S. PATENT DOCUMENTS

| | | | |
|---|---|---|---|
| 3,177,139 | A | 4/1965 | Kimberlin, Jr. et al. |
| 3,314,882 | A | 4/1967 | Schroeder |
| 3,350,300 | A | 10/1967 | Hess et al. |
| 3,408,290 | A | 10/1968 | Scheibel |
| 3,823,000 | A | 7/1974 | Johnson |
| 3,966,583 | A | 6/1976 | Cramer |
| 3,983,032 | A | 9/1976 | Hess et al. |
| 4,141,825 | A | 2/1979 | Conger |
| 4,261,818 | A | 4/1981 | Sweeney |
| 5,628,895 | A * | 5/1997 | Zucholl ............... 210/85 |
| 5,679,254 | A | 10/1997 | Chakrabarti |
| 8,119,007 | B2 | 2/2012 | Bajpayee et al. |
| 2011/0108481 | A1* | 5/2011 | Bajpayee et al. ........ 210/642 |

FOREIGN PATENT DOCUMENTS

| WO | WO-2006/029452 A1 | 3/2006 |
|---|---|---|
| WO | WO-2007/048242 A2 | 5/2007 |

OTHER PUBLICATIONS

He, Mingyan, et al., "Concentrating Solutes and Nanoparticles within Individual Aqueous Microdroplets", Analytical Chemistry, vol. 76, No. 5, pp. 1222-1227 (2004).

Hilder, M. H., "The solubility of water in edible oils and fats", Journal of the American Oil Chemists' Society, vol. 45, No. 10, pp. 703-707 (1968).

Hoerr, C. W., et al., "The effect of water on the solidification points of fatty acids. Solubility of water in fatty acids", Oil & Soap, vol. 19, No. 7, pp. 126-128 (1942).

Benavides, Jorge, et al., "Extraction and Purification of Bioproducts and Nanoparticles using Aqueous Two-Phase Systems Strategies", 31 Chem. Eng. Technol., pp. 838-845 (2008).

European Patent Office, "International Search Report and Written Opinion for PCT/US2012/058660" (Dec. 20, 2012) (corresponding PCT application).

* cited by examiner

WATER EXTRACTION USING A DIRECTIONAL SOLVENT

RELATED APPLICATION

This application claims the benefit of U.S. Provisional Application No. 61/542,934, filed 4 Oct. 2011, the entire content of which is incorporated herein by reference.

BACKGROUND

In this century, the shortage of fresh water is expected to surpass the shortage of energy as a global concern for humanity, and these two challenges are inexorably linked. Fresh water is one of the most fundamental needs of humans and other organisms. Each human needs to consume a minimum of about two liters per day in addition to greater fresh-water demands from farming as well as from industrial processes. Meanwhile, techniques for transporting fresh water or for producing fresh water via desalination tend to be highly demanding of increasingly scarce supplies of affordable energy.

The hazards posed by insufficient water supplies are particularly acute. A shortage of fresh water may lead to famine, disease, death, forced mass migration, cross-region conflict/war (from Darfur to the American southwest), and collapsed ecosystems. In spite of the criticality of the need for fresh water and the profound consequences of shortages, supplies of fresh water are particularly constrained. 97.5% of the water on Earth is salty, and about 70% of the remainder is locked up as ice (mostly in ice caps and glaciers), leaving only 0.75% of all water on Earth as available fresh water.

Moreover, that 0.75% of available fresh water is not evenly distributed. For example, heavily populated countries, such as India and China, have many regions that are subject to scarce supplies. Further still, the supply of fresh water is often seasonally inconsistent. Typically confined to regional drainage basins, water is heavy and its transport is expensive and energy-intensive.

Meanwhile, demands for fresh water are tightening across the globe. Reservoirs are drying up; aquifers are falling; rivers are dying; and glaciers and ice caps are retracting. Rising populations increase demand, as do shifts in farming and increased industrialization. Climate change poses even more threats in many regions. Consequently, the number of people facing water shortages is increasing.

Massive amounts of energy are typically needed to produce fresh water from seawater (or to a lesser degree, from brackish water), especially for remote locations. Reverse osmosis (RO) is currently the leading desalination technology. In large-scale RO plants, the energy/volume required can be as low as 4 kWh/m$^3$ at 30% recovery, compared to the theoretical minimum around 1 kWh/m$^3$, although smaller-scale RO systems (e.g., aboard ships) are less efficient. Another popular method is the multi-stage flash (MSF) distillation, also an energy and capital intensive process.

Rather than extracting pure water, electrochemical methods, such as electrodialysis (ED) and capacitive desalination (CD), extract just enough salt to achieve potable water (<10 mM). Current large-scale electrochemical desalination systems are less efficient than RO plants at desalinating seawater (e.g., 7 kWh/m$^3$ is the state of the art in ED), but become more efficient for brackish water (e.g., CD can achieve 0.6 kWh/m$^3$). In general, existing techniques for removing salt from water, some of which have existed for centuries, tend to be expensive or complicated or both.

Energy and water are becoming more and more intertwined, especially in the context of oil and gas production. Large amounts of water are typically required to extract oil and gas, and millions of gallons of high salinity [i.e., a high total-dissolved-solids (TDS) content] water are produced. This produced water is unfit for industrial or domestic use and unsafe to discharge into the rivers, ground, or any other sink whereby it may mix with the public water supply. Furthermore, most of this water is also unfit for recycling in oil and gas extraction. Often, extraction sites are located far from fresh water sources making it expensive to transport the water and imperative to recycle the water produced on site. For example, extraction of shale gas and oil by hydraulic fracturing requires 5-7 million gallons of water per well. 20-40% of this volume flows back to the surface as highly saline water. This water needs to be treated before it can be recycled or discharged. The higher salinity of flowback and produced water (up to 8 times more saline than seawater) renders most existing desalination processes insufficient. Higher TDS accelerates membrane fouling and quickly increases energy consumption. Evaporative processes suffer with scaling and low recovery rates. In light of these developments, it is even more important to implement new desalination processes that can overcome these challenges.

SUMMARY

Methods and apparatus for water extraction (including desalination and treatment) using a directional solvent are described herein. The method can be carried out continuously, and apparatus can be designed for continuous operation. The composition from which water is extracted can be, e.g., a mixture, solution or emulsion. Various embodiments of the apparatus and method may include some or all of the elements, features and steps described below.

Certain solvents, such as some fatty acids, possess an unusual characteristic of being able to directionally dissolve water while not dissolving other water-soluble salts, such as sodium chloride, or impurities and while being insoluble or almost insoluble in water (i.e., water dissolves into the majority directional solvent phase, but the directional solvent does not dissolve into the majority water phase in significant amounts). This directional-solubility phenomenon is exploited, herein, in a new continuous or semi-continuous method of temperature-controlled desalination of a saline solution that can be operated in a closed loop.

In a continuous method water treatment or desalination, a directional solvent (e.g., a fatty acid with a carboxylic acid group) is flowed through a loop (circuit); and a liquid composition including water and at least one dissolved component is introduced into the loop where the liquid composition mixes with the directional solvent. Water from the liquid composition dissolves into the directional solvent, while the dissolved component is substantially excluded from the directional solvent in a concentrated remainder. The concentrated remainder is separated from the water-solvent solution and removed from the loop. The water-solvent solution is cooled to precipitate the water from the directional solvent; and the water is separated in a purified form from the directional solvent and removed from the loop. The directional solvent is then recirculated in the loop and the process is repeated in a continuous manner.

In a semi-continuous method for water treatment or desalination, a liquid composition including water is introduced into a vat containing a directional solvent, where the liquid composition passes through and dissolves into the directional solvent. The concentrated remainder of the liquid composition collects in the vat at an opposite end of the vat from where the liquid composition was introduced and is removed. The solvent-water solution is cooled to precipitate the water from the directional solvent, and the precipitated water is separated from the directional solvent and removed.

The methods and apparatus described herein can enable practical adoption of directional-solvent extraction technology for desalination of brackish water or seawater or treatment of produced water from oil and gas extraction and frac "flowback" water from hydraulic fracturing of shale gas and shale oil wells. The described processes can speed up the process described in our previous patent (U.S. Pat. No. 8,119,007 B2) by up to several orders of magnitude. The extracted water can be in the form of substantially pure water (e.g., suitable for industrial or agricultural use or even meeting drinking-water standards of purity, such as 99.95% purity).

The methods of this disclosure do not require the use of membranes, reducing costs and making them suitable for high-TDS waters. The methods of this disclosure can also use low-quality heat, which can come from terrestrial heat sources, from the ocean, from the sun, or as waste heat from other processes. These desalination methods can also be easy to use and can offer significant energy and economic savings over previous desalination methods. Though embodiments for water treatment/desalination are described, the methods and apparatus can similarly be used to separate other liquid compositions.

Figure 1:
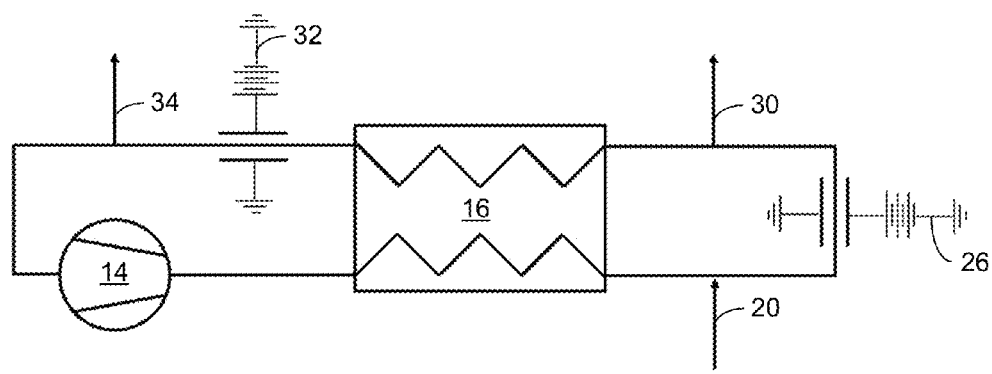
FIG. 1 is a technical diagram of an apparatus for continuous directional-solvent extraction.

In the accompanying drawings, like reference characters refer to the same or similar parts throughout the different views; and apostrophes are used to differentiate multiple instances of the same or similar items sharing the same reference numeral. The drawings are not necessarily to scale, emphasis instead being placed upon illustrating particular principles, discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%, wherein percentages or concentrations expressed herein can be either by weight or by volume) can be understood as being within the scope of the description; likewise, if a particular shape is referenced, the shape is intended to include imperfect variations from ideal shapes, e.g., due to manufacturing tolerances.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Figure 2:
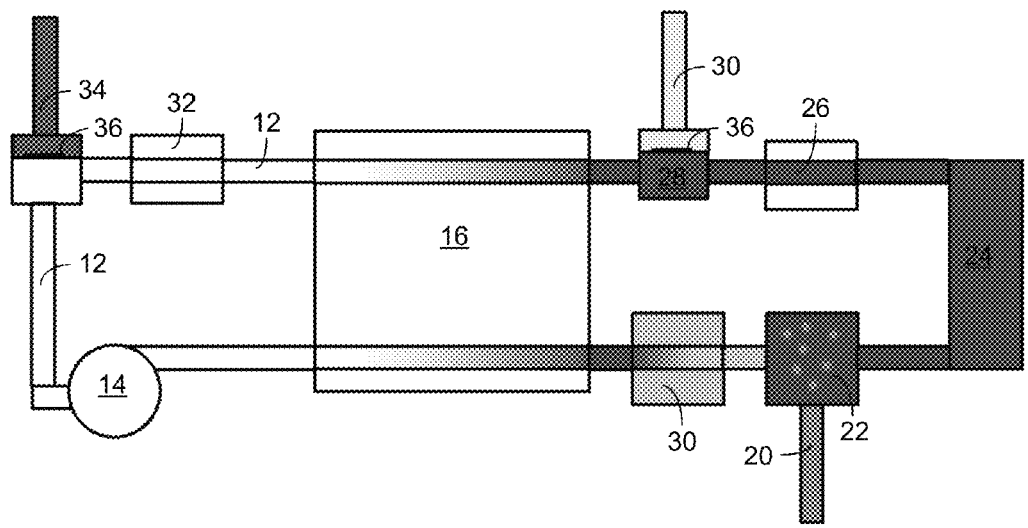
FIG. 2 is a schematic illustration of an apparatus for continuous directional-solvent extraction.

Continuous Desalination/Treatment Apparatus and Method:

An embodiment of an apparatus for continuous water desalination or treatment is shown in FIGS. 1 and 2. The apparatus and method use a directional solvent into which a liquid (e.g., water) readily dissolves but which does not readily dissolve into the liquid (e.g., the concentration of water that dissolves into the directional solvent can be at least 10 times greater than the concentration of directional solvent that dissolves into water). The directional solvent can be in the form, e.g., of an edible oil (such as soybean oil, palm oil, rapeseed oil, coconut oil or linseed oil) that includes one or more fatty acids. Alternatively, an isolated directional-solvent composition (e.g., fatty acid) can be used. Suitable fatty acids can include carbon chains of, for example, 6 to 14 carbon atoms, such as octanoic acid, which has a chain length of eight carbon atoms, or decanoic acid, which has a chain length of ten carbon atoms. Octanoic and decanoic acids are considered substantially insoluble in water (e.g., dissolving into water at 0 to 0.3 volume-%) and are relatively harmless to humans, as they can be found in natural food products, such as milk. The hydrophilic hydroxide group in the fatty acid may bind with water from the liquid composition to dissolve the water into the directional solvent.

In particular embodiments of the methods described herein, water from a saline solution dissolves into the directional solvent at a concentration of at least about 1 volume-% of the directional solvent; and water is precipitated from the directional solvent at a volume of at least about 0.5% of the volume of the directional solvent. Further, the salt concentration in the precipitated water is substantially less than (e.g., less than half or less than a fifth of) the initial salt concentration. The directional solvent can remain in liquid form throughout each method.

The apparatus in FIGS. 1 and 2 includes a plurality of conduits 12 that form a closed loop through which the directional solvent is repeatedly and continuously cycled. The pump 14 at the lower left of the apparatus circulates the directional solvent in a counter-clockwise path through the loop. The directional solvent is then heated by a heat exchanger 16 (that extracts heat from a return path in the loop) and an additional heating device 18 providing heat, e.g., from a boiler, an electric heater, or from solar energy, geothermal heat, waste-process heat or from a combustible fuel, such as diesel, petrol or natural gas.

A liquid composition, such as sea water, brackish water, industrial waste water, or produced water from oil or gas drilling, or hydraulic-fracturing ("frac") flowback water from shale oil/shale gas extraction, is admitted via conduit 20 into a dispenser 22 in the loop at the lower right where it mixes with the heated directional solvent to form an emulsion. Mixing of the liquid composition and the directional solvent can be facilitated in a mixer section 24 by spraying, using a paddle wheel in the conduit to break up the stream, using electric fields to break up drops, causing turbulence by modifying channel geometry or utilizing ultrasound mixing. Once the mixing is achieved, the water phase from the liquid composition is allowed to dissolve into the solvent in an absorption section just past the mixer. This absorption results in a solvent phase containing dissolved water and a brine phase containing some water and salts and other impurities.

The solvent phase and the brine phase are then passed through a liquid separator 26, e.g., in the form of an electro-coalescer, where an electric field is used to separate the brine phase from the solvent/water phase. The brine is attracted to the side of the electro-coalescer 26 with the stronger magnetic field (i.e., the point rather than the plate). Where the brine is denser than the directional solvent, it can be advantageous to position the point of the electro-coalescer at the bottom of the conduit to draw the brine to the bottom. In other embodiments, the liquids can be separated, e.g., by gravitational separation, magnetic separation, dielectrophoresis, centrifugal separation, or by a cyclonic separator or a lamellar separator.

The brine 31 is segregated in a separator 28 and discharged from the loop via conduit 30, while the solvent/water solution is allowed to pass through a cooling section in the heat exchanger 16, where heat is transferred to the liquid composition passing through the other side of the heat exchanger 16. In addition to or as an alternative to cooling in the heat exchanger 16, the circuit can include a chiller downstream of the heat exchanger 16 or provide ambient or evaporative cooling for the solvent/water solution. Upon cooling, the pure water precipitates out of the solvent to reform an emulsion. This emulsion is then passed through a second liquid separator 32, such as one of those described above (e.g., an electro-coalescer) to separate the precipitated water from the solvent. The treated (purified) water is recovered via conduit 34, and the directional solvent is re-circulated through conduit 12 back through the other conduits 12 in the process loop.

After (downstream from) each liquid separator 26 and 32, a horizontal physical partition 36 is placed in the conduit at the height of the interface of the two phases (layers), such that the top layer (e.g., the solvent/water phase after the first electro-coalescer 26 and the solvent after the second electro-coalescer 32) is directed over the partition 36 and the bottom layer (e.g., the brine after the first electro-coalescer 26 and the purified water after the second electro-coalescer 32) is directed under the partition 36. The height of the partition 36 can be dynamically adjusted, e.g., via controlled buoyancy (wherein the buoyancy of the partition 36 is between that of the two phases) or by using an optical sensor coupled with a processor and a displacement motor coupled with the partition 36 to dynamically raise and lower the partition 36 on command.

In particular embodiments, the partition 36 that follows the first electro-coalescer 26 can be offset from the interface between the phases and positioned slightly into the solvent/water phase (potentially sacrificing some of the solvent/water phase but reducing the potential for brine to be mixed with the solvent/water phase downstream). Meanwhile, the partition 36 that follows the second electro-coalescer 32 can be positioned slightly into the purified-water phase (potentially sacrificing some of the purified water, which will be re-circulated in the loop, but reducing the potential for solvent to be removed with the purified water). The precise positions of the partitions 36 in any embodiment can be established as a function of balancing cost and quality objectives. Similarly, flow rate through the system can be established based on whether low cost (higher flow rates) or high-quality purification (lower flow rates) are more highly prized. For some end uses of the purified water, the apparatus and process can be engineered to de-emphasize purity of the resulting water (e.g., allowing more salt to remain in the water); for example, water with a higher salt content can be used to grow hardier/more-salt-resistant crops, such as cotton.

Figure 3:
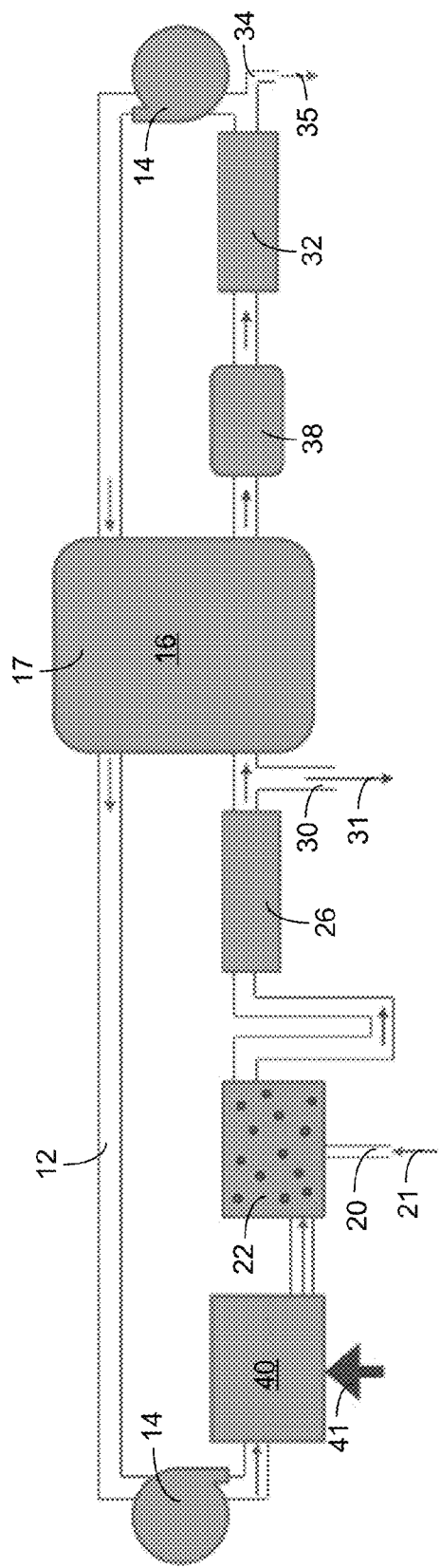
FIG. 3 is a schematic illustration of another embodiment of an apparatus for continuous directional-solvent extraction.

In an alternative configuration, shown in FIG. 3, pumps 14 are employed on opposite sides of the heat exchanger 16 to maintain circulation of the directional solvent through the loop; and a cooling device 38 (e.g., a radiator) is mounted to the conduit downstream from the heat exchanger 16, wherein the heated solution passes through the radiator 38 to release heat therefrom before the purified water is separated from the directional solvent (at a lower temperature) before the directional solvent is reheated as it cycles back through the opposite side 17 of the heat exchanger 16 (where heat is added) and through a gas furnace 40 where additional heat is supplied to the directional solvent, e.g., by burning natural gas to facilitate the dissolution of the liquid feed composition therein.

The substantially pure water 35 produced with the methods and apparatus described herein can have a weight-to-weight salt content of, e.g., less than 1.5%, less than 0.14%, or less than 0.05%. Optionally, an additional desalination can be on the purified water output after the above-described water-separation methods to reach a higher level of water purity. For example, a second stage of desalination can be in the form of ultra-filtration, nano-filtration, reverse osmosis or flash distillation.

Semi-Continuous Desalination/Treatment Apparatus and Method:

A semi-continuous desalination/treatment apparatus includes one or more large vats filed with directional solvent. The directional solvent is heated via solar energy in the vat, which can be painted black to absorb heat; or by capturing waste or geothermal heat; or by electric heating or burning combustible fuel, such as gasoline, diesel, or natural gas. In particular embodiments, the vat can be designed to be shallow and wide (e.g., with a diameter-to-height ratio greater than 1) to reduce settling times and to render the liquids conducive to solar heating.

Figure 4:
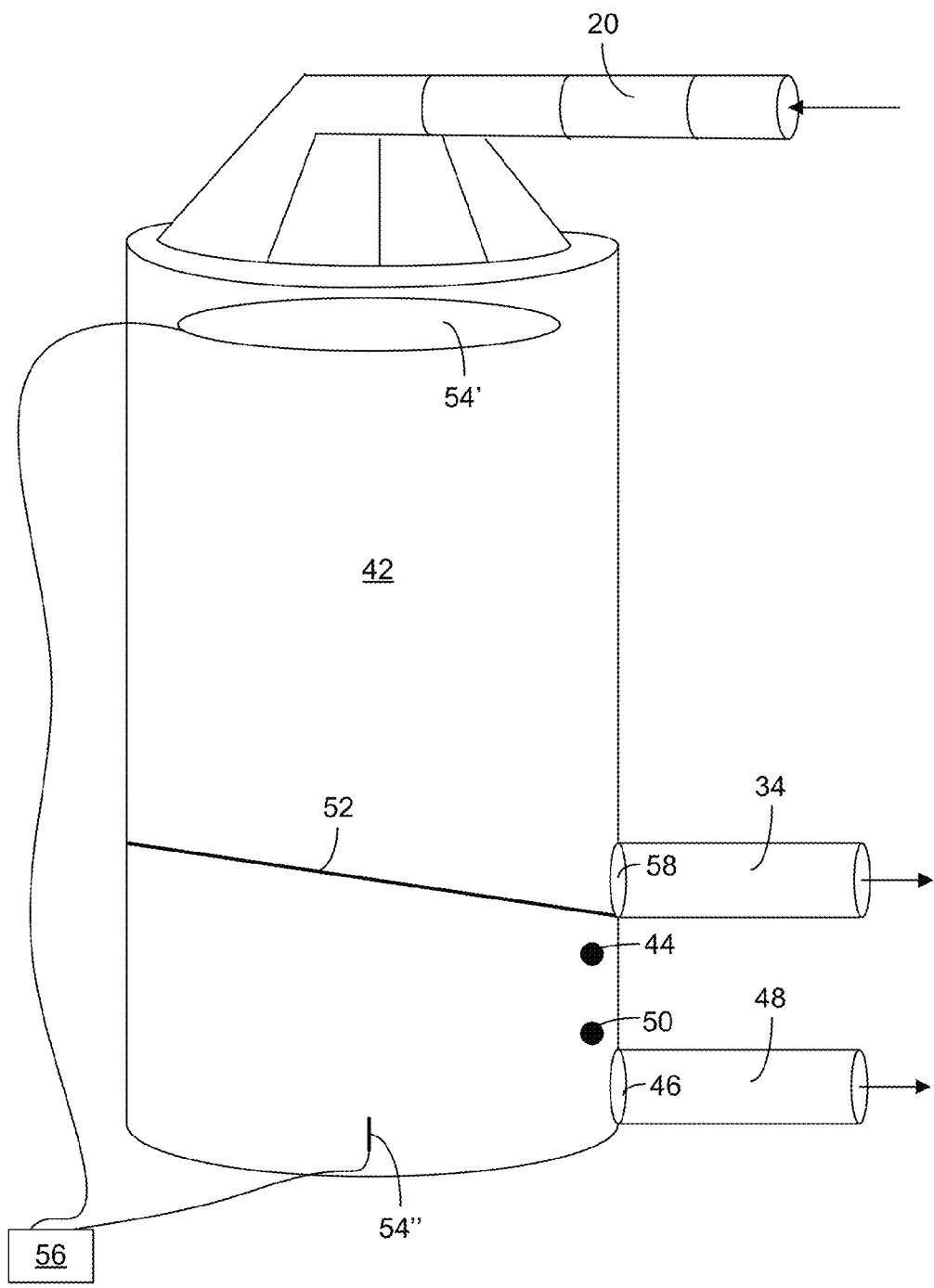
FIG. 4 is a sketch of a directional-solvent vat for semi-continuous water treatment/desalination.

A sketch of a single-vat apparatus that can be used in "off-grid" locations (without connection to an external electrical grid) is depicted in FIG. 4. The liquid composition (e.g., saline or impure water) enters at the top of the vat 42 via conduit 20 or from another direction suitable for proper mixing of the water and solvent. A mechanism (e.g., a sprayer) is provided at the top of the vat 42 that will cause the entering liquid composition to enter as droplets, wherein multiple droplets are introduced at the same time, like a "rainfall" of water droplets through the bulk of the solvent. As these droplets fall towards the bottom of the vat 42 due to gravity, they dissolve in the solvent and get smaller in size.

Eventually, salt water (brine) ends up at the bottom of the vat 42, and a solvent-water mixture is left at the top of the vat 42 due to density differences. A first density sensor 44 (that detects the density of the liquid with which it is in contact) can be used to determine when the brine has risen too high (i.e., when it reaches the height of the first density sensor). When this happens, the flow of sea water into the vat 42 is ceased. After a specified period of time, all of the brine is collected at the bottom of the vat 42, leaving the oil-water mixture at the top. The time delay is to give the falling droplets the opportunity to be absorbed and settle at the bottom.

After the brine has settled at the bottom of the vat 42, a valve 46 (in the flow path from the vat 42 to the conduit 48) opens, and the brine flows out of the bottom of the vat 42 through the conduit 48. When the brine level becomes sufficiently low, the valve 46 is shut off. To determine this shut-off point, a second density sensor 50 is operated at a specified height beneath the first density sensor and is configured to detect when the brine drops below that height. After brine removal, purified water can be removed conduit 34, as described below. The removed brine may be pumped to the top of the vat 42 and the whole process repeated to extract more pure water. At some point, getting more water out of the brine will become economically and energetically unfeasible; and the process can be restarted with fresh sea water.

At this point (advantageously, in the time frame from the middle of the day to dusk when temperatures are highest), the brine is pumped away; and a partition 52 is created between the brine and the solvent-water mixture in the vat 42, e.g., in the form of a folding layer partition 52. In a simple embodiment, the partition 52 can be unfolded to segregate the sections of the vat 42 by pulling a rope coupled with the edge of the partition 52. The partition 52 prevents the brine remaining at the bottom of the vat 42 from getting mixed with the pure water above. The partition 52 is also slanted to connect with a closed pipe 34 for water removal in the side of the vat 42. After the two sections of the vat 42 have been separated by the partition 52, an electric voltage is applied to electrodes 54' and 54" to separate water and solvent above the partition 52 by electro-coalescence or dielectrophoresis (DEP).

Where dielectrophoresis is used, a power supply 56 is coupled via conductive wires to the pair of electrodes 54' and 54", respectively positioned at the bottom and top of the vessel 42. The power supply 56 produces a potential difference across the electrodes, wherein the non-uniformity of the electrode shapes (e.g., a flat plate 54' at one end and a needle 54" at the other end) produces a non-uniform electric field that acts on the water droplets to separate them from the solvent. The needle electrode 54", which produces the stronger field, can be positioned at the bottom. Consequently, substantially pure water, which has a greater density than the solvent, can be collected at the bottom of the upper section; and the solvent can be collected at the top of the upper section. A valve 58 (positioned just above the partition 52) then opens and the purified water drains out of the side of the vat 42 through conduit 34. In particular embodiments, the valve 58 can be opened to drain the purified water at night when temperatures are cooler. After the purified water is extracted, the whole process is repeated.

Figure 5:
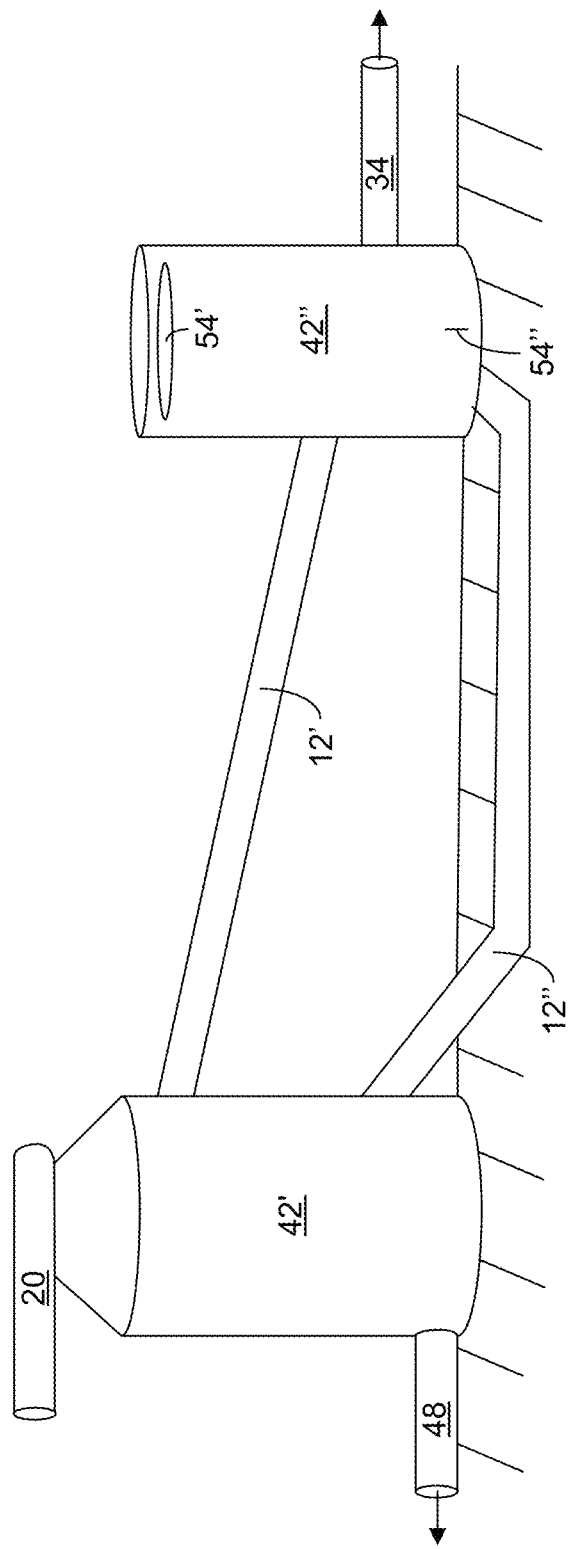
FIG. 5 is a sketch of a two-vat apparatus for semi-continuous water treatment/desalination using a directional solvent.

A two-vat apparatus is shown in FIG. 5. To effectively heat and cool the solvent and solvent-water mixture, heating and cooling pipe sections 12' and 12" are incorporated between two vats 42' and 42"—where an absorption vat 42' contains warm oil and a separation vat 42" contains cool oil. The solvent can be heated using solar energy; by capturing waste or geothermal heat; or by electric heating or burning combustible fuel, such as gasoline, diesel, or natural gas, before entering the absorption vat 42'. Mixing occurs, as explained above.

After the water is dissolved in the solvent, the solvent-water solution is transferred through a cooling pipe 12" to the separation vat 42". The solution can be cooled by exchanging heat via a heat exchanger with the heating pipe 12', cooling in air, cooling in seawater, or by burying the cooling pipe 12" underground. The solvent-water solution enters the separation vat 42" after cooling down to a desired temperature (e.g., between 0 and 50° C.). In this separation vat 42", dielectrophoresis (electro-coalescence) can be used via a pair of electrodes 54' and 54", as described above, to separate the solvent from the precipitated water. Thereafter, the water and oil can be drained separately. The solvent can then be re-heated (e.g., up to 25-110° C.) in a pipe 12 leading back towards the absorption vat 42'.

Exemplification of the Continuous Directional-Solvent-Extraction Process:

This exemplification of the process was carried out with an apparatus matching the schematic illustration of FIG. 3, discussed above. This continuous desalination process accomplishes the following tasks in the given order with the solvent flowing in a closed loop and with the water flowing in an open loop.

First, the directional solvent is heated via a heat input 41 in the heater 40 to the highest temperature in the process. This heating can be accomplished by running the solvent through any heat source 40, which in the case of on-site oilfield operation can be a tank-less natural gas furnace. On-site gas is readily available at oil and gas well sites and is currently used for heating other processes. Furthermore, it would be difficult to recover waste heat from well-site operations at the first system demonstration stage.

Second, feed water 21 is added and mixed with the solvent in the mixer 22. The mixing of feed water with the solvent at high temperatures facilitates water dissolution. This mixing can be accomplished by a paddle wheel or a stirrer in the mixing chamber, by spraying the incoming feed water into the solvent, or simply by using a specific flow pattern that facilitates formation of water droplets in the solvent. In other embodiments, the mixer 22 can be a static mixer, a dynamic mixer, a stirrer, or a cyclonic mixer.

Third, water is dissolved into the directional solvent. The system allows a short flow time during which the water is dissolved into the solvent while maintaining the high process temperature. A dissolution time of 60 seconds is sufficient and a more detailed analysis is presented, below.

Fourth, un-dissolved brine is separated from the solution in the separator 26. Following the dissolution of water, the un-dissolved brine 27 is separated from the solvent-water solution in a first-stage separation process. This separation can be accomplished gravitationally (as described, below) or by using an electrocoalescer, as described above.

Fifth, the solvent is cooled, and heat is recovered. After the brine is removed, the solvent stream is cooled down to facilitate the precipitation of pure water. Advantageously, energy from this stream can be recovered. As such, the solvent stream is cooled by exchanging heat with the returning solvent stream, for example, in a liquid-liquid plate heat exchanger 16. Following the heat exchanger 16, the solvent is further cooled using a radiator 38.

Sixth, precipitated water 35 is separated from the solvent in the separator 32. This precipitation step is where pure water 35 is recovered in a second-stage separation process. This separation may be accomplished by using an electro-coalescer or an in-line centrifuge, although the latter may involve high electrical energy consumption.

Seventh, the solvent stream is pre-heated for recycled use. After the water 35 is separated and recovered, the solvent stream returns to the gas furnace via an opposite side of the heat exchanger 16, where the solvent is pre-heated, as mentioned in the fifth step, above, and is conveniently recycled.

In the continuous directional solvent extraction system, as shown in FIG. 3, for a unit processing 1 m$^3$/day of feed-water, energy consumptions are 1 KWh$_e$ in the pump 14, 200 KWh$_{th}$ in the furnace 40, and 0.5 kWh$_e$ in the coalescer 32. 21 m$^3$ of octanoic acid, acting as the directional solvent, is circulated counterclockwise through the loop, while 1 m$^3$ of feed water at 80° C. is injected through conduit 20; 0.3 m$^3$ of brine at 89° C. is extracted from conduit 30; and 0.7 m$^3$ of purified water at 25° C. is recovered from conduit 34. The temperature of the liquid composition in the loop is 25° C. from the radiator 38 into the heat exchanger 16 ($\epsilon$=80%), where the liquid composition is heated to 77° C. Between the pump 14 and furnace 40, the liquid composition is 70° C.; and the liquid composition is at 90° C. after leaving the furnace until entering the heat exchanger 16.

Based on experiments, a recovery ratio of 70%, a product water yield of 3.3%, and thermal energy consumption of 200 kWh are shown. The calculations assume a heat exchanger effectiveness of 80%, which is reasonable for a balanced liquid-liquid heat exchanger 16.

This continuous process can eliminate the manual processing involved in a batch process, reduce energy consumption by recovering some energy from the cooling stream, and also significantly reduce cycle time by expediting the separation processes, which are currently the rate limiting step in the system. It is expected that the continuous process can reduce the cycle time to less than 10 minutes, thus allowing about 150 cycles per 24-hour day.

Figure 6:
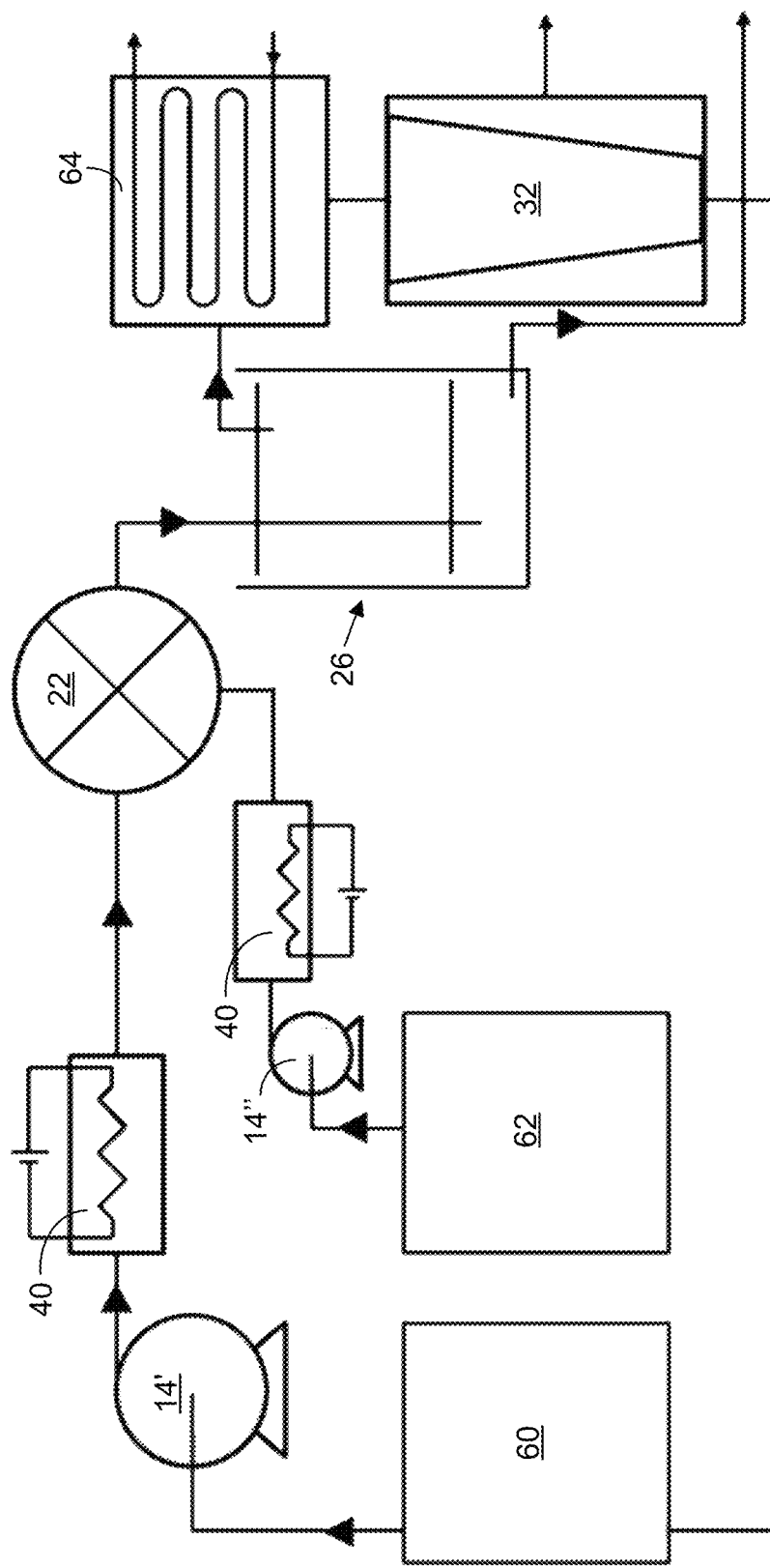
FIG. 6 is a schematic diagram of a constructed laboratory prototype system for the continuous directional-solvent-extraction process.

FIG. 6 is a schematic diagram of the laboratory prototype. The lab prototype is a simplified version of the designed continuous process such that it replaces the proposed natural gas furnace with an electric heater serving as the heater 40 and replaces the electrocoalescer with an inline centrifuge as the separator 32. The electric heater is convenient and practical to operate in the laboratory environment, and it was much easier to obtain a small-scale in-line centrifuge than a small-scale coalescer. Individual prototype component design is discussed, as follows.

Octanoic acid was used as the solvent to test the continuous process. Two five-gallon high-temperature plastic buckets were used as reservoir tanks 60 and 62 for the solvent and feed water, respectively.

An Omega PHP-800 series 160 W chemical metering pump from Omega Engineering, Inc. (Stamford, Conn., United States) was used as the pump 14' circulating the solvent from the tank 60; and a Solenoid 4 W metering pump from ProMinent Fluid Controls, Inc. (Pittsburgh, Pa., United States) was used as the pump 14" to pump the feed water 21 from the tank 62. Metering pumps are highly controllable and allowed for flow variations over experimental runs.

Electrical heaters 40 were used to raise the temperature of the solvent and the feed water going to the process loop. Two Flow-through heaters from Omega Engineering, Inc., with resistive heating elements of 5 kW and 1.5 kW, respectively, were used to heat the solvent and water respectively. The current input to the heaters 40 may be regulated using the attached control unit.

After passing through the heaters 40, the solvent and feed water streams entered the mixer 22, which is the first component of the loop that was specifically designed and constructed within the laboratory. The mixer 22 includes the following three major components: a cylindrical containment vessel, a stirrer, and a restraining stand.

The containment vessel is a capped cylinder, four inches in diameter and 45 cm in length. Removable end caps provide access to the inside of the vessel, which allows proper cleaning and maintenance. The top cap had two ports for the solvent and contaminated water and a hole in the center for the stirrer rod; the bottom cap had one port for the mixture leading to the brine separator. Accordingly, the liquids enter and leave the containment vessel through barbed pipe fittings attached to the caps. The first version of the containment vessel was made out of polyvinyl chloride (PVC) plastic. The PVC was replaced by chlorinated polyvinyl chloride (CPVC) to be able to withstand temperatures higher than 65° C.

Figure 7:
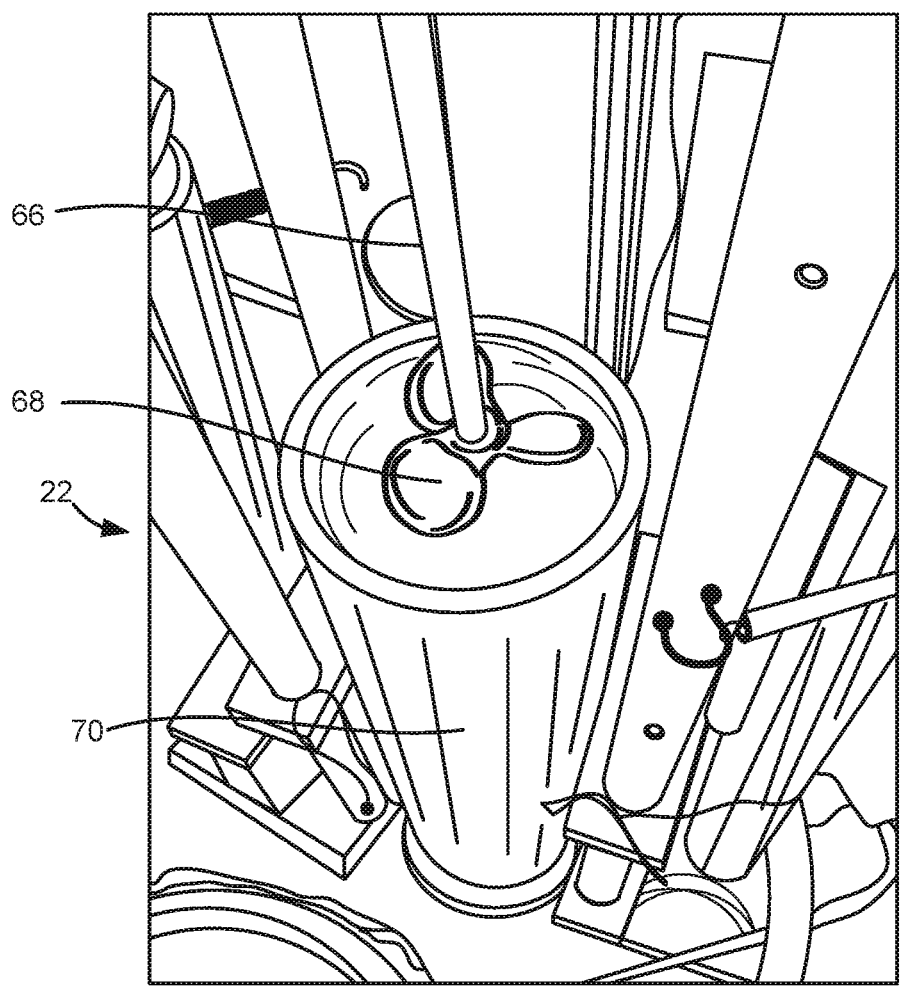
FIG. 7 is a photographic image of a stirring propeller blade being lowered into a mixer containment vessel.

The stirrer was a BDC digital stirrer from Caframo Limited (Wiarton, Ontario, Canada) with a shaft 66 connected to a three-inch diameter propeller blade 68 at its end which facilitated the actual mixing as shown in FIG. 7. The stirrer speed was controllable between 40 and 2000 rpm. The shaft 66 of the stirrer was long enough that the propeller 68 was more than half way down the containment vessel 70 to ensure proper mixing. FIG. 7 shows the propeller blade 68 being lowered into the mixer containment vessel 70. Following construction, the containment vessel 70 was covered with insulation to minimize heat losses during prototype operation. Heaters were mounted on the mixer stand to minimize prototype footprint. Solvent and feed water entered through fittings in the top cap (not shown) of the containment vessel 70; the stirrer ran a propeller blade 68 used to mix the solvent and feed; and mixture exited through a fitting in the bottom cap of the containment vessel 70.

Advantageously, the residence time of the water and solvent mixture in the containment vessel 70 of the mixer 22 were greater than the time required for water to dissolve into the solvent. The rate of dissolution of water from the droplet into the solvent is given by the following equation:

$$N_W = \frac{D_{W/OA}(C_{W/W} - C_{W/OA})}{r},$$

where $N_w$ is the molar flux of water from the droplets into octanoic acid; $D_{w/OA}$ is the diffusion coefficient of water in octanoic acid; $C_{w/w}$ is the molar concentration of water in the feedwater droplets; $C_{c/OA}$ is the molar concentration of water in the octanoic acid; and r is the feed water droplet size. This model assumes quasi-steady state diffusion from a sphere into an infinite medium.

The diffusion coefficient of water in octanoic acid was not measured but based on values of self-diffusion coefficients of water and octanoic acid found in existing literature, its value is expected to be $D_{w/OA} \sim 10^{-1}$ m²/s. This value is also expected from our previously reported calculations for the diffusion coefficient of water in decanoic acid which was found to be about $0.5 \times 10^{-10}$ m²/s. The larger the feed water droplets in the octanoic acid, the slower the diffusion will be. As discussed in detail in the next section, it is reasonable to expect feed water droplets of diameter on the order of 100 µm. According to the above equation, a water droplet of 100 µm in size should dissolve completely in octanoic acid in about 0.6 seconds. This extremely short time scale suggests that the water dissolves into the solvent almost instantly compared to the process time scales.

Figure 8:
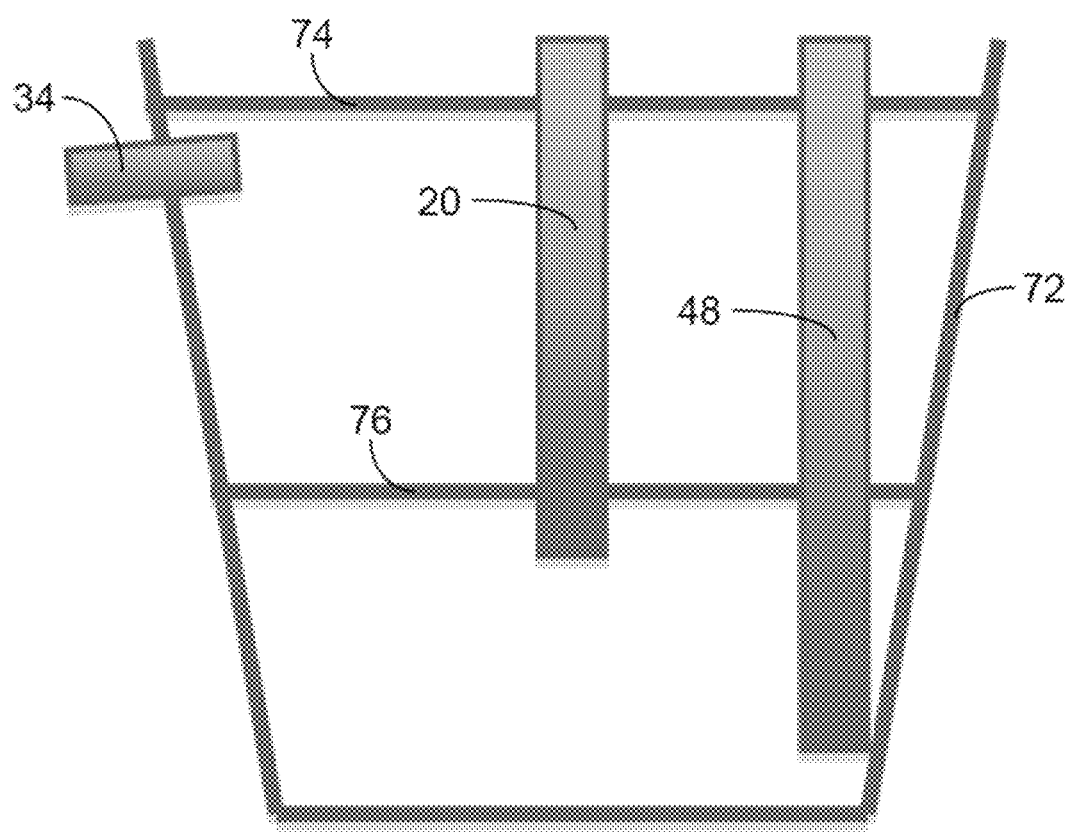
FIG. 8 is a schematic diagram of a brine separator design, where the solvent/brine mixture from the mixer setup enters through the mixture inlet in the center; the solvent rises through notches in the turbulence minimizer disc and is extracted from the top solution outlet; the brine collects at the bottom and is discharged via the brine outlet using a siphon pump.

After leaving the mixer 22, the feed-water-in-solvent emulsion reaches the first separator 26, where the undissolved brine is separated. In the laboratory prototype, a gravitational separator 26 was found to be sufficient for brine separation, thus minimizing the energy consumption of this separation process. A schematic diagram of the design of the separator 26 is shown in FIG. 8. The separator housing 72 was a five-gallon high-temperature plastic bucket about 33 cm in height and having a top diameter of 30 cm, tapering to about 25 cm at the bottom.

A top cover plate (disk) 74 and a bottom plate (turbulence minimizer disk) 76, made of acrylonitrile butadiene styrene (ABS) are placed into the separator housing 72. The liquid mixture enters the housing 72 through a pipe 20 below the bottom plate 76. The bottom plate 76 has holes or notches around its circumference, which define orifices by themselves or in combination with other surfaces in the vessel, wherein the orifices serve to minimize turbulence from the flow and any mixing of the brine with the contents above the bottom plate 76. The notches or holes allow for the liquid to flow up, rise, and fill the separator housing 72. As the mixture enters, the brine droplets, being heavier than the solvent, begin to settle gravitationally. Brine accumulates at the bottom of the separator 26 and is discharged periodically into a waste tank from the brine outlet 48 using a siphon pump. The solvent containing the pure water reaches the top and is extracted from the top solution outlet 34. The height difference between the mixture inlet (at the base of the pipe 20) and the top solution outlet is 20 cm. The top cover plate 74 serves to contain the liquids within the housing 72 and prevent splashing.

In operation, the solvent/brine mixture from the mixer setup enters through the mixture inlet 20 in the center of the vessel 72. The solvent rises through notches in the turbulence minimizer disk 76 and is extracted from the top solution outlet 34. The brine collects at the bottom and is discharged via the brine outlet 48 using a siphon pump.

The gravitational settling of the droplets may be approximated as Stokes flow of a sphere (droplet) through a viscous fluid (solvent). The terminal velocity, v, of the falling droplets is expressed as shown in the following equation:

$$v = \frac{1}{18}\left(\frac{\rho g D^2}{\eta}\right)$$

While the droplets are settling, the bulk of the liquid (i.e., the solvent) rises as it fills up the separator housing 72. The solvent containing the dissolved water is extracted via outlet 34 at the top of this housing 72. To ensure that the brine droplets do not reach the top outlet 34, the residence time, $t_{res}$, of the solvent in the brine separator 26 must be greater than the time required for the brine droplets to settle through the height of the separator 26, as indicated in the following equation:

$$t_{res} > \frac{H}{v},$$

where H is the height of the separator 26, and v is the droplet terminal velocity.

The terminal velocity depends on the size of the brine droplets. The droplet size is expected to change with the mixing speeds and the resulting agitation. The droplet sizes should be smaller for higher mixing speeds. To investigate this phenomenon, the droplet sizes were measured during prototype construction by taking samples of the solvent/brine mixture from the mixer outlet. By the time of reaching the mixer outlet, the dissolution of water is likely to have already happened and the remaining droplets would represent the un-dissolved brine.

Figure 9:
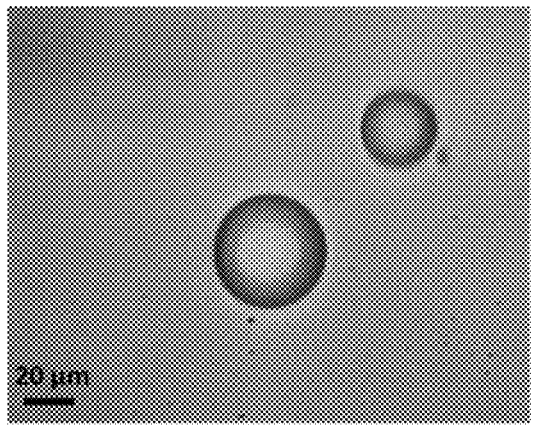
FIG. 9 is a magnified microscopic photograph of water droplets in octanoic acid formed in a mixer operating at 500 rpm.
Figure 10:
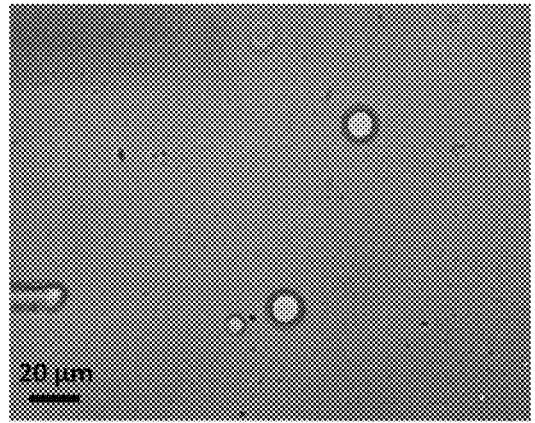
FIG. 10 is a magnified microscopic photograph of water droplets in octanoic acid formed in a mixer operating at 1,500 rpm.

The mixer stirrer was run at the following three speeds: 500 revolutions per minute (rpm), 1000 rpm, and 1500 rpm. About 0.5 ml of the sample was taken, placed on a glass slide, and observed under a Eclipse LV100 microscope from Nikon. Photographs were taken under a bright field and at 40× magnification. Representative photographs taken with a microscope are shown in FIG. 9 for 500 rpm and in FIG. 10 for 1500 rpm. For a stirrer speed of 500 rpm, the brine droplet diameters were found to be in the range 30 to 195 µm with about 97% of the volume contained in droplets greater than 104 µm in diameter. For a separator height, H, of 20 cm (as constructed), a residence time of greater than 169 seconds is required to separate 97% of the brine droplets. Similarly, for a stirrer speed of 1000 rpm, the brine droplet diameters were in the range of 11 to 59 µm with about 97% of the volume contained in droplets greater than 50 µm in diameter. Therefore, to separate 97% of the brine droplets, a residence time of greater than 12 minutes is employed. Finally, for a stirrer speed of 1500 rpm, the brine droplet diameters were in the range of 7 to 50 µm, with about 97% of the volume contained in droplets greater than 37 µm. Therefore, to separate 97% of the brine droplets, a residence time of greater than 21 minutes is employed.

After exiting the brine separator 26, the solvent-water solution is cooled to precipitate out the desalinated water. In the original continuous process design, this precipitation was accomplished in a heat exchanger. To simplify construction, heat recovery was not employed in the prototype device, and a chiller 64 was used instead. This component had a simple design with a stainless-steel immersion "wort" chiller placed inside a five-gallon plastic bucket. Stainless steel was used as octanoic acid can be corrosive to copper, which would otherwise provide better heat transfer. Tap water was circulated through the chiller coils and was used as the heat-transfer fluid. The solvent-water solution begins cooling as soon as it enters the chiller bucket. The cooled liquid is expected to sink to the bottom of the bucket, where it is extracted using an Omega PHP-800 chemical metering pump similar to the one described earlier. A clear liquid was observed to enter the chiller 64 where it became cloudy upon cooling due to water precipitation, as was also seen in the batch process experiments.

After cooling down in the chiller 64, the precipitated water is separated from the directional solvent. This separation, as discussed earlier, can be accomplished through passive gravitational separation or accelerated through centrifugation, which increases the gravitational force, or by using an electrocoalescer, which increases the size of water droplets by coalescing them so that they may settle faster under gravity. In every scenario, and much like the separation of the brine from the solvent described earlier, the separation kinetics here also depend on the size of the water droplets suspended in the octanoic acid phase.

Figure 11:
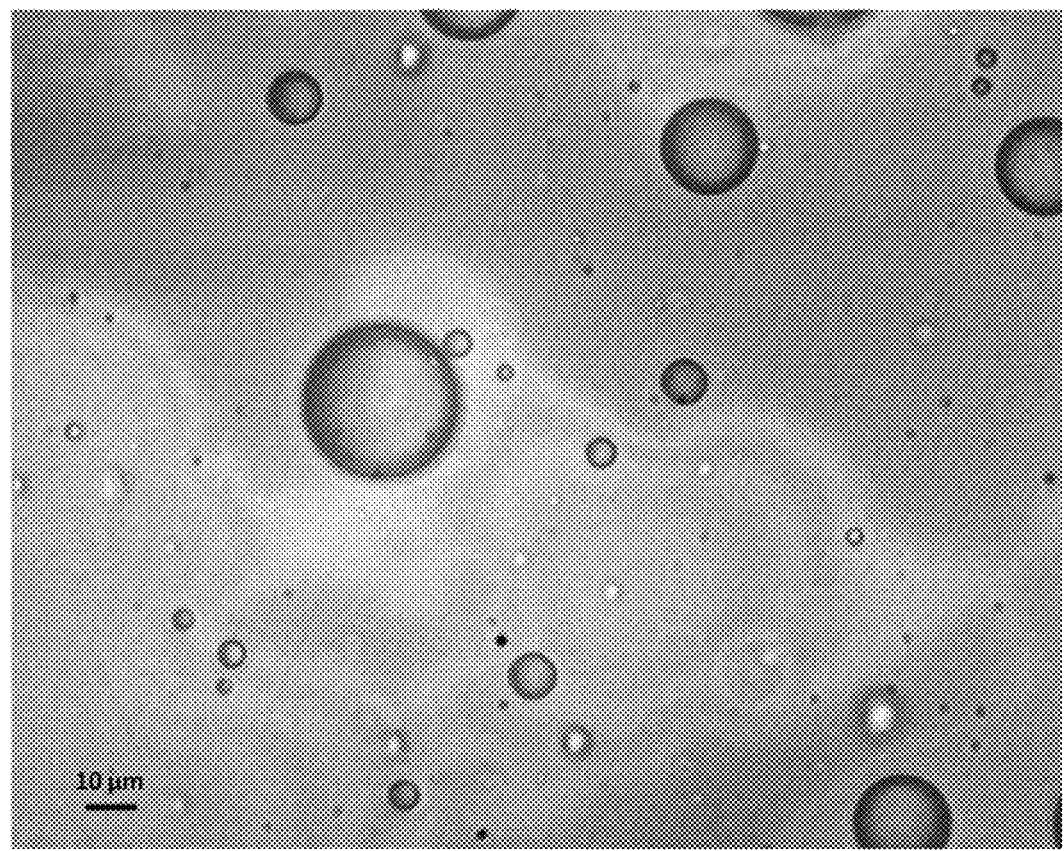
FIG. 11 is a magnified microscopic photograph of precipitated pure water droplets in octanoic aced from samples collected after passing through the chiller in the continuous process prototype.

Samples of the solvent-water emulsion exiting the chiller were taken and observed under a microscope to measure the sizes of the water droplets. A representative microscopic image is shown in FIG. 11. The distinguishable droplets varied between 1 µm and 30 µm in diameter with over 97% of the volume contained within droplets larger than 5 µm.

Again, treating the droplets as spheres settling under Stokes' flow through a viscous fluid, according to the above equations, 5-µm droplets would take over 30 hours to settle through a 30-cm height of a five-gallon bucket like the ones used as solvent and feed water reservoirs 60 and 62. It is therefore desirable to accelerate this separation process.

A commercial in-line centrifuge 32, Model V02 from CINC industries (Carson City, Nev., United States) was used to separate the water from the solvent. According to manufacture specifications, this centrifuge 32 is able to provide a maximum relative centrifugal force of 1600 g. The rotor diameter for this model is 5.1 cm, which is the distance across which the water droplets need to move to be separated from the octanoic acid. According to the above equations, at the maximum force and to separate droplets larger than 5 µm, the residence time of the emulsion within the centrifuge 32 is about 12 seconds. A residence time chart from the equipment manual for the centrifuge suggests that the residence time would be greater than 12 seconds for flow rates lower than 0.01 L/s, which also becomes the upper limit for the process flow rate. This residence time serves to reduce the achievable throughput rates significantly.

Temperature measurements were taken all along the process loop using installed in-line thermocouples. These in-line thermocouples were inserted into the path of flow using T-adapters and thus provide continuous temperature readout in a clean, automatic way without manual intervention. Temperature readouts were obtained through a 34901A 20 Channel Multiplexer Module from Agilent Technologies, Inc. (Santa Clara, Calif., United States) installed on an Agilent 34970A Data Acquisition Unit.

The footprint of the apparatus was 90 cm×60 cm, and its total height was 190 cm, including the mixer setup. This directional-solvent-extraction prototype was run with octanoic acid as the directional solvent and with a 3.5% w/w aqueous solution of sodium chloride as feed. After troubleshooting, all prototype components functioned as planned and expected in the design with reasonable variation. The heaters 40 were controllable and achieved high temperatures between 85° C. and 90° C. The mixer 22 met the desired performance metrics, as discussed above. The brine separator 26 performed extremely well at the experimental flow rates, with the product water containing very low salinities, as discussed in the following text. The chiller 64 also functioned reasonably well.

A representative experimental run using the apparatus of FIG. 6 was carried out with the octanoic acid at 31.1° C. in the solvent feed tank 60 and with the feed water at 27.2° C. in its feed tank 62. The octanoic acid was pumped (via the pump 14' operating at 14 W) out of its tank 60 at 18.85 g/s and passed through the electric heater 40, operating at 2.3 kW, where it was heated to 86.5° C. The feed water (with 3.5% TDS) was pumped (via the pump 14" operating at 1 W) out of its tank 62 at 0.77 g/s and through the heater 40, operating at 188 W, where it was heated to 85.3° C. The octanoic acid and feed water were mixed in the mixer 22 to form a mixture at 86.2° C. The mixture was then directed into the brine separator 26 (at 81.4° C.), from which the brine was separated at the bottom as a waste stream that exits the loop at a flow rate of 1.24 g/s and at a temperature of 34° C. Meanwhile, the solvent/water solution was removed from the top of the separator 26 and passed through the chiller 64, where it was cooled to 36.6° C. by a cooling-water inflow at a flow rate of 319 g/s and at a temperature of 27.1° C. The cooling water exits the chiller 64 at 28.8° C. after extracting heat from the solvent/water solution. A 14-W pump (not shown) between the chiller and the in-line centrifuge then pumps the cooled liquid composition into the centrifuge, from 0.11% TDS product water was extracted at a temperature of 36.3° C. and at a rate of 0.55 g/s.

The flow rate of 0.77 g/s for the feed water input corresponds to about 66.5 liters/day or about 0.42 barrels (bbl)/day. The flow rate of 0.55 g/s for the product in the form of desalinated water corresponds to about 47.5 liters/day or about 0.3 bbl/day, thus achieving about 71% recovery. The thermal energy consumption for this run was about 1251 kWh/m$^3$, though it should be noted that this prototype did not employ heat recuperation, and with an 80% heat recovery, as discussed in the process design, this run would have an energy consumption of 250 kWh/m$^3$.

The actual electrical energy consumption for this process due to pumping was about 14.5 kWh$_e$/m$^3$. The metering pumps 14 that were used, while highly controllable, were energy inefficient; and, in this case, a large part of the electricity was used by the display and the control module. In addition, the process flow path was not optimized and significant pressure losses existed that could be avoided with better flow path design. Typical pumping energy consumptions of industrial liquid pumping and solvent extraction processes are on the order of 0.01-0.04 kWh/m$^3$ of fluid pumped. Using directional-solvent extraction, however, since the product water is only about 3% of the total flow volume, it is expected that the pumping energy consumption of the process, after optimizing the flow path and with using industrial centrifugal pumps, would be about 0.3-1.2 kWh/m$^3$ of water desalinated.

Performance parameters in the above-discussed once-through directional-solvent-extraction process are summarized in Table 1, below.

TABLE 1

Performance summary of once-through prototype run:

| | |
|---|---|
| Water production (bbl./day) | 0.42 |
| Recovery ratio | 71% |
| Feed TDS | 35,000 |
| Product TDS | 1100 |
| Thermal Energy consumption (actual, kWh/m$^3$) | 1251 |
| Thermal Energy consumption (with heat recovery) | 250 |

Additional experiments with 3.5% TDS feed water and octanoic acid evidenced an increase in purified water yield with increasing driving temperature differences. For example, a driving temperature difference of 50° C. produced a purified water yield of about 3% (for a recovery over 70%), while a driving temperature difference of 22° C. produced a purified water yield of about 1% (for a recovery of about 20%). Further still, lower feed/solvent ratios were found to produce higher recovery ratios; e.g., a feed/solvent ratio of 4%, where the starting feed water had 3.5% TDS and ΔT was 50° C., the recovery ratio was about 70%, while an 8% feed/solvent ratio under the same conditions is expected to offer a recovery ratio of about 40%.

Finally, an important process parameter, the cycle time, $t_{cycle}$, was estimated by measuring the total functional volume of the prototype device and dividing that volume by the volumetric flow rate, as follows:

$$t_{cycle} = \frac{V_{functional}}{Q_{total}}$$

To measure the functional prototype volume, the system was purged of liquids, and the cycle loop was closed (i.e., the outlet of the chiller 64 was connected to the solvent reservoir 60 as an input). This closure ensured that any liquid going into the cycle returned to the solvent reservoir 60. The feed-water reservoir 62 was taken out of the process loop since it is a minor volume. The solvent reservoir 60 was then filled with octanoic acid, and the solvent pumps 14 were run at 0.01 liters/second. As the octanoic acid level in the solvent reservoir 60 fell, more octanoic acid was added to maintain the level. This was continued until the octanoic acid level became steady (i.e., the inflow was equal to the outflow), which implied that the functional system volume was then full. The pump power was then gradually increased to 0.03 liters/second to ensure that this increase did not change the solvent level. The total volume of octanoic acid added then gave the functional system volume. This volume was found to be about 32 liters.

Therefore, at the flow rate of 0.018 liters/second, as demonstrated in the representative run, the cycle time was about 30 minutes and, at the maximum allowable flow rate of 0.026 liters/second, was about 20 minutes. Adding 30 to 60 seconds for centrifugal or coalescer separation would not change these times significantly. With improved process refinement, the inventors believe that this process time could likely be reduced to half or less of this time. Possible modifications include optimal sizing of the brine separator 26 such that the flow residence time in this component is just enough to allow the brine droplets to settle through its height; this refinement may include the use of a shallower and wider brine separator 26. Another possible modification to reduce cycle time is to reduce the size of the mixer 22 such that the residence time in this component is minimal, especially since it is observed that the water dissolves into the solvent almost instantaneously.

Multi-Stage Directional Solvent Extraction:

Directional solvent extraction has been shown to be effective for higher-TDS feed waters all the way up to saturated brines. This ability opens up the possibility of reusing the brine from one process cycle as feed for a subsequent cycle, with a view to recover even more desalinated product water. This modification to the directional-solvent-extraction cycle is herein referred to as multi-stage directional solvent extraction. A multi-stage process may involve two or more stages; i.e., the brine from first stage is used as feed for a second stage and the brine by-product from the second stage is used as feed for a third stage and so on, until any more stages become impractical or the salt begins to crystallize out of solution.

A major advantage of a multi-stage process is that it can provide even higher recoveries than those already demonstrated using single-stage directional solvent extraction. This higher recovery can be very significant in the produced-water treatment scenario or in another application where greater value is placed on high recoveries. Accordingly, a multi-stage process was investigated experimentally and is described, below.

In this experiment, octanoic acid was used as the directional solvent to investigate multi-stage stage directional solvent extraction. Feed water samples were made using 3.5% w/w sodium chloride in distilled-water solution to simulate seawater, and a 10% w/w sodium chloride solution was made to simulate produced water. The octanoic acid was first saturated with water at ambient temperature (25° C.), as explained before. Similar to the earlier experiments, 100 g of octanoic acid were taken in a conical flask and heated on a heating and stirring plate. The acid was heated and maintained at 90° C. in all experimental runs. Both feed water samples (3.5% and 10%) were added to the octanoic acid while stirring in varying amounts between 4 g and 10 g (4% and 10% feed/solvent ratio) over different experimental runs. Stirring was continued for one minute to allow for dissolution of the water into the solvent. Stirring was then stopped; the flask contents were maintained at 90° C.; and un-dissolved brine droplets were allowed to settle gravitationally for one minute. Thereafter, two clear layers of solvent with dissolved water (top) and brine (bottom, as described above) were observed to form in the flask. The solvent-water solution was carefully decanted into conical tubes maintained at room temperature of 25° C.

The remaining brine at the bottom of the beaker was then poured off into another test tube; the weight of the brine was recorded, and it was saved for use in the next stage. The experimental cycle was then repeated, except that the brine from the previous stage was used as feed. The second stage brine was also collected and used as feed for a third stage.

The decanted solvent-water solutions from all three stages were allowed to cool in ambient air for about 60 minutes to room temperature (25° C.). As described above, the clear solution turned cloudy indicating the precipitation of water from the solvent. These samples were transferred to a centrifuge and centrifuged at relative centrifugal force of 5000 g for about 60 seconds. The test tubes were observed to have two clear layers of settled water (bottom) and the solvent (top). The water was recovered by piercing a hole in the bottom of the test tubes, and the solvent was saved for reuse.

The recovered water samples from all three stages were measured for weight and salinity, and the resulting yield, product TDS, and recoveries were recorded. In most experimental runs, except for the one with the 10% first-stage feed-to-solvent ratio, no brine was left at the end of the third stage. Instead, salt was observed to crystallize out and was left behind at the bottom of the beaker as a white precipitated residue.

Figure 12:
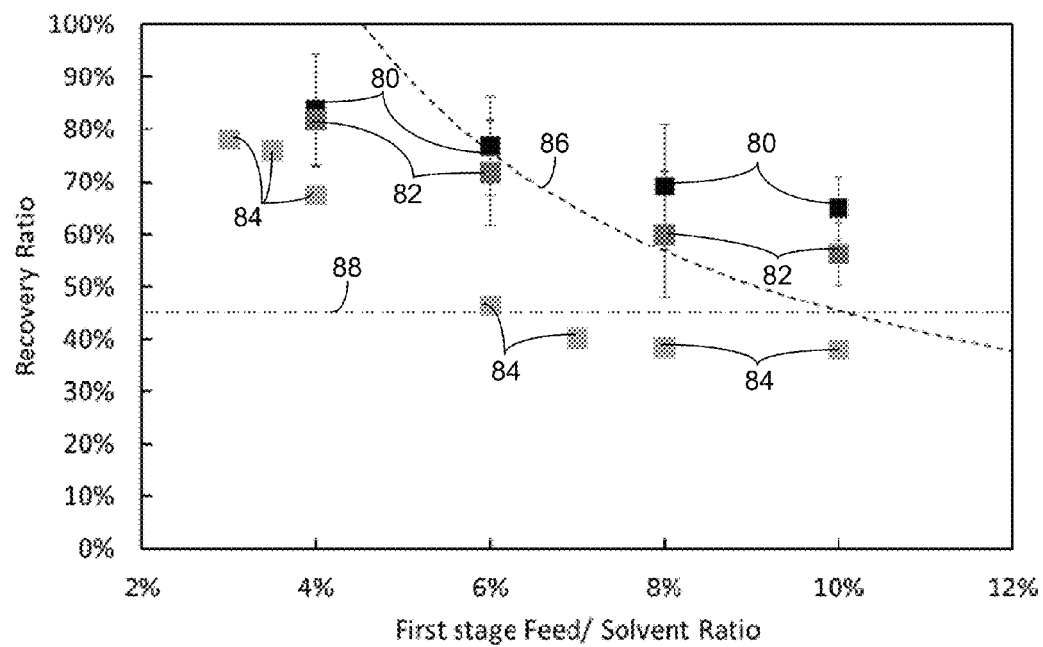
FIG. 12 is a plot three-stage directional-solvent-extraction ratios as a function of first-stage feed-to-solvent ratio for 3.5% and 10% TDS feed water with octanoic acid as solvent and $\Delta T=65°$ C.

The obtained recoveries are depicted in FIG. 12, where the achieved recoveries for seawater concentrations are in the range of 65% to 85%, and those for produced water concentration are in the range of 56% to 82%, which are much greater than representative reverse-osmosis recoveries for seawater desalination. Three-stage recoveries are significantly greater than single-stage recoveries; and for feed-to-solvent ratios of over 6%, the three-stage recoveries for 3.5% TDS and 10% TDS feed water are even greater than the theoretically expected single-stage recoveries for pure water.

In FIG. 12, the three-stage directional-solvent-extraction recovery ratio is plotted as a function of first-stage feed-to-solvent ratio for 3.5% (squares 80) and 10% TDS (squares 82) feed water with octanoic acid as solvent and $\Delta T=65°$ C. The results are compared with experimental recoveries for single-stage 3.5% TDS water (squares 84) and also with theoretically expected recoveries based on Hoerr's solubility estimates for pure water in octanoic acid (broken line 86); representative seawater reverse-osmosis (RO) recovery (broken line 88) is also superimposed for comparison.

As noted, in most experimental runs, except for the run with 10% first-stage feed-to-solvent ratio, no brine was left at the end of the third stage; and salt was observed to crystallize out and precipitate. This might seem to indicate 100% recovery; yet the maximum apparent recovery was 85%. The additional water was (a) lost due to evaporation, (b) lost due to the crude recovery method of piercing a hole in the test tube, or (c) remained bound with the hydrated salt. Sodium chloride sometimes crystallizes as a dehydrate ($NaCl.2H_2O$), in which case, about 2.16% water will remain bound to it for 3.5% TDS feed, and 6.17% water will remain bound for 10% TDS feed. The likelihood of this happening is extremely low as sodium chloride has negligible probability of forming a hydrate at 25° C. and atmospheric pressure. This suggests that most of the water loss is due to evaporation or experimental oversight.

Figure 13:
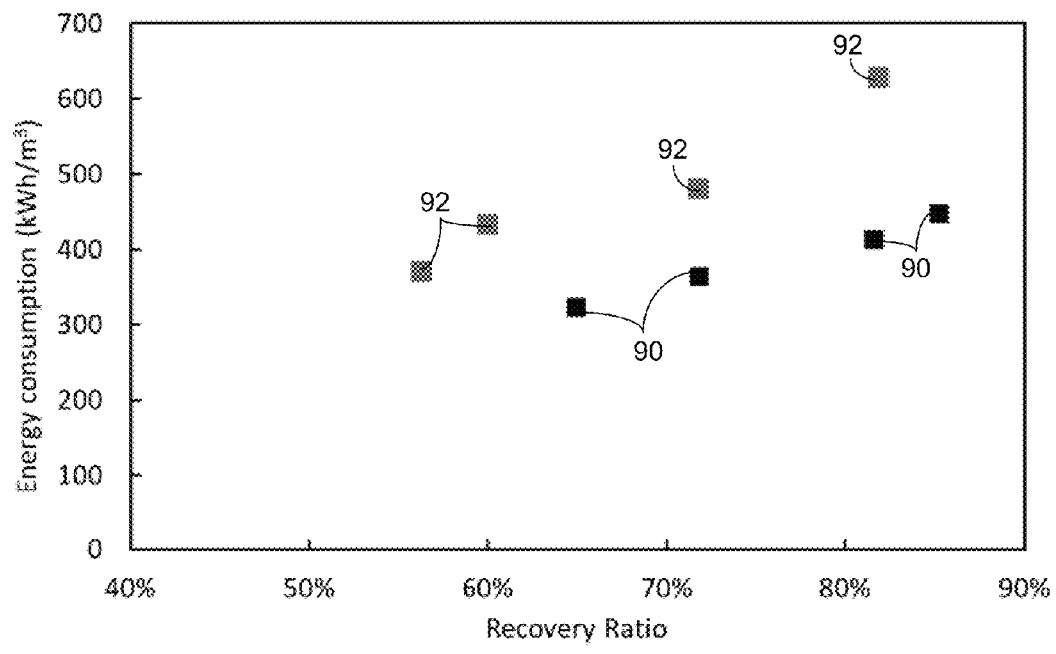
FIG. 13 is a plot of thermal energy consumption of a three-stage directional-solvent-extraction process for varying experimental recoveries with octanoic acid as solvent and a driving temperature difference, $\Delta T=65°$ C.

As mentioned earlier, however, the greater recoveries come at a greater energy price. The experimental energy consumption translated to energy consumption in an industrial scenario where heat recovery is used, is depicted in FIG. 13, which shows the thermal energy consumption of a three-stage directional-solvent-extraction process for varying experimental recoveries with octanoic acid as solvent and a driving temperature difference, $\Delta T=65°$ C.; calculations assume a heat exchanger effectiveness of 80%. As may be seen, the energy consumption ranges, 320-450 kWh/m$^3$ for seawater concentrations and 370-630 kWh/m$^3$ for produced water concentration, are much higher than the energy consumption for single-stage directional solvent extraction or that of other thermal processes. This higher energy consumption is a result of the diminishing product water yield in every successive stage due to reduced feed amounts and increased salinity. Actual inputs and data for one experimental run are shown below in Table 2, below, to illustrate this point.

TABLE 2

Experimental scenario for a three-stage directional-solvent-extraction process with a 3.5% starting feed TDS:

|  | FSR | TDS | Recovery |
| --- | --- | --- | --- |
| Stage 1 | 6% | 3.50% | 52% |
| Stage 2 | 2.21% | 7.29% | 54% |
| Stage 3 | 1.14% | 16.02% | 65% |
| Overall | 6% | 3.50% | 84% |

Multi-stage directional solvent extraction has been demonstrated as a desalination method that can achieve higher recoveries than any known conventional desalination method. Recoveries as high as 85% have been demonstrated for 3.5% TDS feed water, and recoveries as high as 82% have been demonstrated for 10% TDS feed water. The high recoveries, however, are, as shown, achieved at much higher energy consumption than a single-stage process. Such higher energy consumptions may be acceptable in situations where high recoveries imply significantly higher economic values. In fact, for produced water treatment, a key requirement for the treatment method is very high recoveries or zero liquid discharge.

Another method of achieving high recoveries, without significantly losing on the energy consumption, is to mix the brine from one stage with the source feed water and use the mixture as feed for another stage or, in other words, recirculating the brine a prescribed number of times depending upon the initial salinity and the maximum allowable specific energy consumption.

An example of this scenario, with octanoic acid as directional solvent and a driving temperature difference of 65° C., is presented in Table 3, below. A feed-to-solvent ratio of 10% and a starting feed salinity of 3.5% are considered. The feed salinity for subsequent stages is calculated based on the recovery of the preceding stage and on the additional feed water added to maintain the 10% feed-to-solvent ratio. As shown in Table 3, over 79% recovery is achieved when the brine is recirculated 10 times with a specific energy consumption of 291 kWh$_{th}$/m$^3$. In contrast, the experimental energy consumption, without mixing the brine with additional feed, was about 400 kWh$_{th}$/m$^3$ for 80% recovery, as shown by squares 90 in FIG. 13.

TABLE 3

Calculated illustration of a multi-stage directional-solvent-extraction process where the un-recovered brine is recirculated and mixed with additional feed water such that the feed to solvent ratio remains constant at 10%; calculations are for 3.5% starting feed salinity, octanoic acid as directional solvent, and a driving temperature $\Delta T = 65°$ C.:

|  | FSR | TDS | Recovery | Specific energy consumption (kWh/m$^3$) |
|---|---|---|---|---|
| Stage 1 | 10% | 3.50% | 40% | 214 |
| Stage 2 | 10% | 4.90% | 34% | 249 |
| Stage 3 | 10% | 6.09% | 32% | 263 |
| Stage 4 | 10% | 7.21% | 29% | 289 |
| Stage 5 | 10% | 8.23% | 28% | 299 |
| Stage 6 | 10% | 9.21% | 27% | 309 |
| Stage 7 | 10% | 10.15% | 26% | 321 |
| Stage 8 | 10% | 11.06% | 25% | 333 |
| Stage 9 | 10% | 11.94% | 24% | 346 |
| Stage 10 | 10% | 12.78% | 23% | 361 |
| Overall | 10% | 3.50% | 79% | 291 |

Another scenario for a starting feed salinity of 10% is presented in Table 4, below. The calculations are similar to those of Table 3. As calculated, a recovery ratio of 76% is achieved at a specific energy consumption of 367 kWh/m$^3$ when brine is recirculated 10 times. In contrast, the experimental energy consumption, without mixing the brine with additional feed, was about 480 kWh/m$^3$ for 72% recovery, as shown by squares 92 in FIG. 13. These are experimentally derived predictions for the designed recirculating multi-stage directional solvent extraction process.

TABLE 4

Calculated illustration of a multi-stage directional-solvent-extraction process, where the un-recovered brine is recirculated and mixed with additional feed water such that the feed-to-solvent ratio remains constant at 10%; calculations are for 10% starting feed salinity, octanoic acid as directional solvent, and a driving temperature $\Delta T = 65°$ C.:

|  | FSR | TDS | Recovery | Specific energy consumption (kWh/m3) |
|---|---|---|---|---|
| Stage 1 | 10% | 10.00% | 27% | 309 |
| Stage 2 | 10% | 10.95% | 26% | 321 |
| Stage 3 | 10% | 11.86% | 24% | 346 |
| Stage 4 | 10% | 12.70% | 23% | 361 |
| Stage 5 | 10% | 13.50% | 23% | 368 |
| Stage 6 | 10% | 14.29% | 22% | 376 |
| Stage 7 | 10% | 15.06% | 21% | 393 |
| Stage 8 | 10% | 15.79% | 21% | 393 |
| Stage 9 | 10% | 16.53% | 20% | 412 |
| Stage 10 | 10% | 17.23% | 19% | 433 |
| Overall | 10% | 10.00% | 76% | 367 |

Exemplary Applications:

One application for these apparatus and methods is in petroleum oil or natural gas production, wherein the directional solvent can be used to separate salts and other components that are insoluble in the directional solvent from, for example, "produced water" (i.e., water that is produced along with the oil and gas) or "fracking water" (i.e., water from hydraulic fracturing) that is generated, in particular, when extracting oil from tar sands or when extracting natural gas from shale. The fracking water can have a salt concentration three times as great as that of typical sea water and can include, for example, benzene and heavy metals. And typically, the produced water or fracking water is transported offsite for treatment and/or containment in above-ground pools.

Both reverse osmosis and multi-stage flash exhibit lower performance in produced or fracking water treatment, where a much higher salinity in the produced or fracking water increases energy consumption and causes increased membrane fouling. By instead mixing the produced water with the directional solvent, most of the water can be extracted in substantially pure form using relatively low energy and heat inputs and at a reasonable cost, leaving a much more concentrated and lower volume waste product and allowing the extracted water to be reused in the oil extraction process, thereby offering substantial environmental benefits in terms of waste containment, lower water demands, less environmental pollution and greater efficiency.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method for continuous water extraction, comprising:
   (a) flowing a directional solvent in a continuous and substantially closed circuit;
   (b) introducing a liquid composition including water and at least one dissolved component into the circuit where the liquid composition mixes with the directional solvent;
   (c) heating the directional solvent before or after the introduction of the liquid composition;
   (d) dissolving water from the liquid composition into the directional solvent to form a water-solvent solution, while substantially excluding from the directional solvent a concentrated remainder including the component that was dissolved in the liquid composition;
   (e) separating the concentrated remainder from the water-solvent solution with a first physical partition positioned to split a majority of the water-solvent solution from the concentrated remainder orthogonally to an incoming flow direction of the water-solvent solution and the concentrated remainder and removing the concentrated remainder from the circuit with the first physical partition;
   (f) cooling the water-solvent solution to precipitate the water from the directional solvent;
   (g) separating the water in a purified form from the directional solvent by electro-coalescence or dielectrophoresis and removing a majority of the purified water with a second physical partition orthogonally to an incoming flow direction of the purified water and the directional solvent following the electro-coalescence or dielectrophoresis; and
   (h) recirculating the directional solvent in the circuit and repeating steps (b)-(g).

2. The method of claim 1, wherein heating the directional solvent includes heating by a heater selected from a furnace, a boiler, an electric heater, a gas heater, a solar heater, and a geothermal heater.

3. The method of claim 1, wherein cooling the water-solvent solution includes cooling by a chiller or a heat exchanger or by ambient cooling or evaporative cooling.

4. The method of claim 1, wherein heat from the water-solvent solution is transferred to the directional solvent via a heat exchanger.

5. The method of claim 1, wherein the directional solvent is a fatty acid.

6. The method of claim 5, wherein the fatty acid has a chain length of 6-14 carbon atoms.

7. The method of claim 1, wherein the concentrated remainder includes water, the method further comprising:
   (i) flowing directional solvent through a second continuous and substantially closed circuit;
   (j) introducing a combined feed including additional liquid composition and the concentrated remainder that was removed from the circuit in claim 1, which is referenced in this claim as the first continuous and substantially closed circuit, in step (e) into the second continuous and substantially closed circuit where the combined feed mixes with the directional solvent, wherein the combined feed is added to the directional solvent at a ratio that is substantially the same as a ratio of the liquid composition added to directional solvent in the first continuous and substantially closed circuit;
   (k) heating the directional solvent before or after the introduction of the concentrated remainder;
   (l) dissolving water from the concentrated remainder into the directional solvent to form a water-solvent solution, while substantially excluding from the directional solvent the dissolved component of the concentrated remainder;
   (m) separating the dissolved component from the water-solvent solution and removing the dissolved component from the second continuous and substantially closed circuit;
   (n) cooling the water-solvent solution to precipitate the water from the directional solvent;
   (o) separating the water from the directional solvent, wherein the water separated from the directional solvent is purified water, and removing the purified water from the second continuous and substantially closed circuit; and
   (p) recirculating the directional solvent in the second continuous and substantially closed circuit and repeating steps (j)-(o).

8. The method of claim 7, wherein the directional solvent and concentrated remainder are mixed in the second continuous and substantially closed circuit at a ratio that is substantially the same as a ratio at which directional solvent and liquid composition are mixed in the first continuous and substantially closed circuit.

9. The method of claim 1, wherein the liquid composition is a product of oil or gas extraction.

10. The method of claim 1, wherein the water is separated from the directional solvent by electro-coalescence.

11. The method of claim 1, wherein the water is separated from the directional solvent by dielectrophoresis.

12. The method of claim 1, further comprising using electrocoalescence or dielectrophoresis upstream from the first physical partition to assist with the separation of the concentrated remainder from the water-solvent solution.

* * * * *